US011477663B2

(12) United States Patent
Lotter

(10) Patent No.: US 11,477,663 B2
(45) Date of Patent: Oct. 18, 2022

(54) LOW POWER IOT BOOSTER NETWORK

(71) Applicant: Nextivity, Inc., San Diego, CA (US)

(72) Inventor: Michiel Petrus Lotter, San Diego, CA (US)

(73) Assignee: NEXTIVITY, INC., San Diego, CA (US)

(*) Notice: Subject to any disclaimer, the term of this patent is extended or adjusted under 35 U.S.C. 154(b) by 0 days.

(21) Appl. No.: 16/252,438

(22) Filed: Jan. 18, 2019

(65) Prior Publication Data
US 2019/0230518 A1    Jul. 25, 2019

Related U.S. Application Data

(60) Provisional application No. 62/619,703, filed on Jan. 19, 2018.

(51) Int. Cl.
*H04W 16/26* (2009.01)
*H04W 56/00* (2009.01)
*H04W 4/80* (2018.01)
*H04W 84/18* (2009.01)

(52) U.S. Cl.
CPC ........... *H04W 16/26* (2013.01); *H04W 4/80* (2018.02); *H04W 56/001* (2013.01); *H04W 84/18* (2013.01)

(58) Field of Classification Search
CPC ..... H04W 16/26; H04W 56/001; H04W 4/80; H04W 84/18; H04W 4/70; H04W 24/10; H04W 52/0219; H04W 84/047; H04W 88/08; H04W 88/04; H04W 24/02; H04L 67/12; H04B 7/15535; H04B 7/15557; H04B 7/15542; H04B 17/40; H04B 7/14; H04B 10/29
See application file for complete search history.

(56) References Cited

U.S. PATENT DOCUMENTS

| | | | |
|---|---|---|---|
| 4,468,785 | A | 8/1984 | Harris |
| 2007/0041333 | A1 | 2/2007 | Twitchell |
| 2009/0058635 | A1 | 3/2009 | LaLonde et al. |
| 2010/0311480 | A1 | 12/2010 | Raines et al. |
| 2013/0201316 | A1 | 8/2013 | Binder et al. |
| 2013/0311140 | A1 | 11/2013 | Schechter |

(Continued)

OTHER PUBLICATIONS

Mitici et al., "Energy-efficient data collection in wireless sensor networks with time constraints", Jun. 21, 2016, Elsevier, Performance Evaluation, pp. 34-52 (Year: 2016).*

(Continued)

*Primary Examiner* — Michael K Phillips
(74) *Attorney, Agent, or Firm* — Kilpatrick Townsend & Stockton LLP

(57) ABSTRACT

A wireless signal booster system and sensor processor for an IoT network is disclosed. An IoT Node contains one or more sensors, potentially a sensor processor or processing element and an IoT modem that can connect to the internet or a private IoT network to deliver data to an IoT hub application. The IoT node may also include one or more short range wireless links. The IoT node may communicate directly to a base station and through the base station be connected to the IoT network (which could be the Internet). Alternatively, the IoT node may connect to a base station through a repeater.

10 Claims, 1 Drawing Sheet

(56) References Cited

U.S. PATENT DOCUMENTS

| | | | | |
|---|---|---|---|---|
| 2014/0329498 | A1* | 11/2014 | Cherian | H04W 52/0229 455/411 |
| 2016/0182270 | A1* | 6/2016 | Jungnickel | H04L 27/26526 375/260 |
| 2016/0323156 | A1* | 11/2016 | Zakaria | H04W 24/02 |
| 2017/0019853 | A1* | 1/2017 | Ghosh | H04W 52/0216 |
| 2017/0359804 | A1 | 12/2017 | Manku et al. | |
| 2018/0211176 | A1* | 7/2018 | Khurshudov | G05B 19/406 |
| 2018/0277123 | A1* | 9/2018 | Boesen | G06F 3/017 |
| 2018/0352397 | A1* | 12/2018 | Cariou | H04W 8/08 |
| 2020/0037267 | A1* | 1/2020 | Gray | H04B 17/102 |

OTHER PUBLICATIONS

Zhan et al., "Energy-Efficient Data Collection in UAV Enabled Wireless Sensor Network", Nov. 23, 2017, IEEE, IEEE Wireless Communications Letters, vol. 7, No. 3, pp. 328-331 (Year: 2017).*

Movassaghi et al., "Enabling Interference-Aware and Energy Efficient Coexistence of Multiple Wireless Body Area Networks With Unknown Dynamics", Jun. 7, 2016, IEEE Acess vol. 4, pp. 2935-2951 (Year: 2016).*

Dinh et al., "An Adaptive Low-Power Listening Protocol for Wireless Sensor Networks in Noisy Environments", Sep. 2018, IEEE, IEEE Systems Journal, vol. 12, No. 3, pp. 2162-2173 (Year: 2018).*

Chen et al., "Collaborative Link-Aware Protocols for Energy-Efficient and QoS Wireless Body Area Networks Using Integrated Sensors", Feb. 2018, IEEE, IEEE Internet of Things Journal, vol. 5, No. 1, pp. 132-149 (Year: 2018).*

Hong et al, "A Low-Power WLAN Communication Scheme for IoT WLAN Devices Using Wake-Up Receivers", Jan. 2018, Applied Sciences (Year: 2018).*

Liu et al., "Medium Access Control for Wireless Body Area Networks with QoS Provisioning and Energy Efficient Design", Feb. 2017, IEEE, IEEE Transactions on Mobile Computing, vol. 16, No. 2, pp. 422-434 (Year: 2017).*

Extended European Search Report dated Aug. 10, 2021, from European Patent Application No. 19741452.7, 9 pages.

* cited by examiner

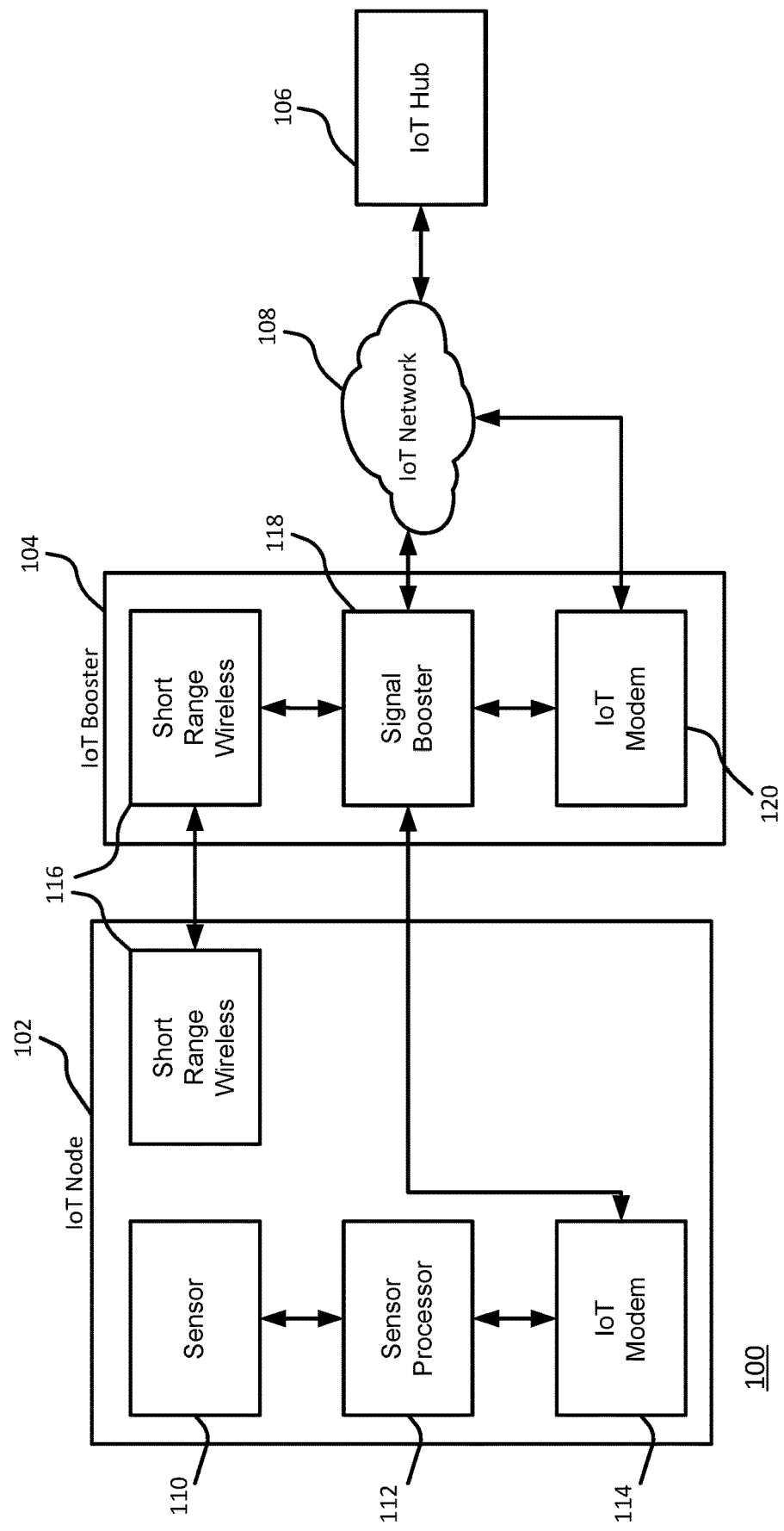

LOW POWER IOT BOOSTER NETWORK

BACKGROUND

Networks of devices that connect machines to the Internet are becoming increasingly popular. Commonly, such networks are known as IoT (Internet-of-Things) networks. Within an IoT network, IoT nodes (which are very often battery powered) typically measure physical values (such as temperature for example), and then perform one or more of the following: store the value locally; transmit the value to the Internet; analyze the value and make a local decision if an action is required and if the action must be reported to the Internet; or any combination of the above.

IoT networks have a few common characteristics, two of which are very important. They must be able to operate over a very long range, and must be able to operate with very low power consumption.

A number of different network technologies are currently being used to deploy IoT networks. These include LoRa, SigFox, LTE CAT-M1 and NB-IoT. These networks have been specifically designed to address the two specific characteristics noted above. However, some problems may still remain unsolved given a conventional architecture of these networks.

Specifically, the uplink power available at the device may not be sufficient to reach the base station and therefore a link to the Internet cannot be established. Further, when using high uplink power to communicate with the base station, the battery life of an IoT node may be severely impacted. Lastly, because of limited processing power and energy available in the node, only limited decisions can be made based on the captured data. This forces more frequent communications with the Internet, which can reduce the overall lifespan of the IoT node.

SUMMARY

In this document, a system including an IOT node is disclosed to address the issues described above. In some aspects, the IoT Node includes one or more sensors, such as a sensor processor or processing element, and an IoT Modem that can connect to the internet or a private IoT network to deliver data to an IoT Hub application. The IoT Node may also include one or more short range wireless links, such as Bluetooth Low Energy (BTLE), which preferably operate with considerably reduced power consumption. The IoT Node may communicate directly to a base station and through the base station be connected to the IoT Network (which could be the internet). Alternatively, the IoT Node may connect to a base station through a repeater.

In some aspects, the IoT booster includes a signal booster and booster function, as well as an IoT modem. It may also include one or more short range wireless links, such as BTLE. The booster can receive a signal from the IoT modem in the IoT node, and boost this signal to allow it to be received by the base station and to then be relayed to the IoT network. It is also possible that the IoT booster may receive signals from the IoT node using the short range wireless link. In both cases (connection via the short range wireless link or the IoT modem link), multiple IoT nodes can connect to a single IoT booster.

In certain aspects, a system is described for communicating in an IoT network. The IoT network is formed of one or wireless communication networks. The system includes an IoT node having a sensor to sense a physical representation of an environment associated with the IoT node, a sensor processor to calculate and generate a value of the physical representation, and a first IoT modem to transmit the value of the physical representation in a wireless signal on a wireless channel. The system further includes an IoT booster in communication between the IoT node and the IoT network. The IoT booster includes a signal booster to receive the value of the physical representation transmitted by the first IoT modem of the IoT node on the wireless channel, and boost the wireless signal containing the value of the physical representation. The IoT booster can further include a second IoT modem to transmit the boosted wireless signal to the IoT network.

In some aspects, the individual IoT node is configured with an On/Off schedule. In yet other aspects, the sensor processor of the individual IoT node is further configured to synchronize its processing activity with the On/Off schedule of the individual IoT node.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 1 illustrates a low power IoT booster and IoT booster network and system.

Like reference symbols in the various drawings indicate like elements.

DETAILED DESCRIPTION

This document describes a low power IoT booster and IoT booster network and system. FIG. 1 illustrates an implementation of a system 100. The system 100 includes an IoT node 102 and an IoT booster 104 connected to an IoT hub 106 via an IoT network 108, such as a communication network. The IoT network 108 can include any number of wired or wireless communication nodes and channels.

In some implementations, the IoT node 102 includes one or more sensors 110, and/or a sensor processor 112 or other form of processing element, and an IoT modem 114 that can connect to the Internet or a private IoT network 108 to deliver data to an application hosted by, or executed by, the IoT hub 106. The IoT node 102 may also include one or more short range wireless links (such as BTLE). The IoT node 102 can communicate directly to a base station, and through the base station be connected to the IoT network 108, which can be the Internet. Alternatively, the IoT node 102 may connect to a base station through a repeater, such as the IoT booster 104 shown in FIG. 1.

In accordance with some implementations, the IoT booster 104 contains a signal booster 118 (such as the Cel-Fi® GO-X signal booster) as well as a second IoT modem 120. The IoT booster 104 can also include a short range wireless link (such as BTLE). The IoT booster 104 receives a signal from the IoT modem 114 in the IoT node 102, and boosts this signal to allow it to be received by the base station and to then be relayed to the IoT network 108. The IoT booster 104 may also receive signals from the IoT node 102 using the short range wireless link. In both cases (connection via the short range wireless link or the IoT modem link), multiple IoT nodes 102 can connect to a single IoT booster 104.

The low power IoT booster network shown in FIG. 1 addresses various problems with current technology. It improves the overall link budget between IoT nodes 102, which can be deployed in, or associated with, an appliance or other object, and the IoT network 108 and IoT hub 106, to allow for a much further reach. This can be achieved in a number of ways, such as increased uplink power for the booster as compared to the IoT modem 114 in the IoT node 102. It can also lead to an improved antenna design, and placement of the antenna connected to the donor side of the booster, as well as improves the overall battery life of the IoT nodes 102. IoT nodes 102 can reduce their Tx power levels as they only need to reach the IoT booster 104 and not the far-away base station or IoT hub 106.

The use of a sensor processor 112 allows complex decision making at the edge of the network and system 100. This reduces the number of times an IoT node 102 must contact the network, and as such, reduces the total energy expensed by the system 100. As can be understood from the above points, the IoT booster 104 takes on the task of communicating with the IoT network 108 in an efficient manner. If the IoT booster 104 is not energy efficient, the overall system will be less efficient.

In accordance with some implementations, the IoT booster 104 incorporates a wireless signal booster that can be switched on and off depending on whether the boosting functions is needed by devices connected via the IoT booster 104. The wireless signal booster receives a schedule from devices connecting through the IoT booster 104 to the IoT network 108 of when the booster must be turned ON and provide signal boosting functionality. Further, the wireless signal booster receives a schedule from devices connecting through the booster to the network of when the booster must be turned ON and provide signal boosting functionality where the schedule is delivered to the booster using the short range wireless link.

In some implementations, a wireless signal booster receives a schedule from devices connecting through the booster to the network of when the booster must be turned ON and provide signal boosting functionality where the schedule is delivered to the booster via remote server. In yet other implementations, a wireless signal booster incorporates a wireless modem and where the wake-up schedule for the booster is determined by the wake-up schedule for the incorporated wireless modem.

In accordance with some implementations, a processing system is presented that can combine the wake-up schedules of multiple IoT nodes 102 as well as the IoT booster 104 into a single wake-up schedule design to optimize the power efficiency of the system. The system can synchronize the wake-up schedule of a number of devices connected to a wireless signal booster in order to reduce the time the booster must be awake and relaying a signal.

In yet other implementations, the sensor processor 112 is provided in an IoT node 102 that synchronizes its processing activity with the On/Off schedule of the IoT node 102. The sensor processor 112 further can synchronize its processing activity with the On/Off schedule of the IoT booster 104, and requires no timed clock element, but whose operation can at least be coarsely synchronized with external events, to process input signals thereby reducing the overall power consumed by the sensor processor.

Although a few embodiments have been described in detail above, other modifications are possible. Other embodiments may be within the scope of the following claims.

The invention claimed is:

1. A system for improving communication with an Internet of Things (IoT) hub via an IoT network, the IoT network comprising one or more wireless communication networks, the system comprising:
   one or more IoT nodes, each individual IoT node including one or more sensors, each sensor to sense a physical representation of an environment associated with the individual IoT node, a sensor processor to generate a value of the physical representation from the one or more sensors, a short range wireless link, and a first IoT modem, the sensor processor further configured to determine a schedule for transmitting the value of the physical representation to the IoT network, the schedule being configured to optimize power efficiency of transmitting the value of the physical representation by the individual IoT node, the schedule being an ON/OFF schedule by which transmitting occurs during an ON portion of the schedule; and
   an IoT booster in wireless communication with each of the one or more IoT nodes via the first IoT modem and the short range wireless link, the IoT booster having a signal booster being configured to receive the schedule from the sensor processor of each individual IoT node for receiving the value of the physical representation transmitted by each individual IoT node from the first IoT modem or the short range wireless link based on the schedule, and boost the wireless signal containing the value of the physical representation according to the schedule, the IoT booster further having a second IoT modem to transmit the boosted wireless signal to the IoT hub via the IoT network.

2. The system in accordance with claim 1, wherein the short range wireless link is a Bluetooth Low Energy (BTLE) link.

3. The system in accordance with claim 1, wherein the individual IoT node and the IoT booster each include a short range wireless transceiver.

4. The system in accordance with claim 3, wherein the short range wireless transceiver of the IoT booster is connected with the signal booster.

5. The system in accordance with claim 1, wherein the sensor processor of the individual IoT node is further configured to synchronize its processing activity with the On/Off schedule of the individual IoT node.

6. The system in accordance with claim 5, wherein the IoT node and the IoT booster each include a short range wireless transceiver for communicating via the short range wireless link.

7. The system in accordance with claim 6, wherein the short range wireless transceiver of the IoT booster is connected with the signal booster.

8. A system for communicating in an IoT network, the IoT network comprising one or more wireless communication networks, the system comprising:
   an IoT node having one or more sensors, each sensor to sense a physical representation of an environment associated with the IoT node, a sensor processor to calculate and generate a value of the physical representation from the one or more sensors, a short range wireless link, and a first IoT modem, the sensor processor further configured to determine a schedule for transmitting the value of the physical representation to the IoT network, the schedule being configured to optimize power efficiency of the individual IoT node when transmitting the value of the physical representation, the schedule being an ON/OFF schedule by which transmitting occurs only during an ON portion of the schedule; and an IoT booster in wireless communication between the IoT node via the first IoT modem and the short range wireless link, and the IoT network via the one or more wireless communication networks, the IoT booster having a signal booster being configured to receive the schedule from the sensor processor of each individual IoT node for receiving the value of the physical representation transmitted by the IoT node from the first IoT modem or the short range wireless link based on the schedule, and boost the wireless signal containing the value of the physical representation according to the schedule, the IoT booster further having a second IoT modem to transmit the boosted wireless signal to the IoT network.

9. The system in accordance with claim 8, wherein the short range wireless link is a Bluetooth Low Energy (BTLE) link.

10. The system in accordance with claim 8, wherein the sensor processor of the IoT node is further configured to synchronize its processing activity with the On/Off schedule of the individual IoT node.

\* \* \* \* \*